Sept. 22, 1953             E. E. GRABINSKI             2,652,863
POWER-DRIVEN TABLE TOOL WITH PORTABLE
VERTICAL-SHAFT MOTOR
Filed May 11, 1948             3 Sheets-Sheet 1
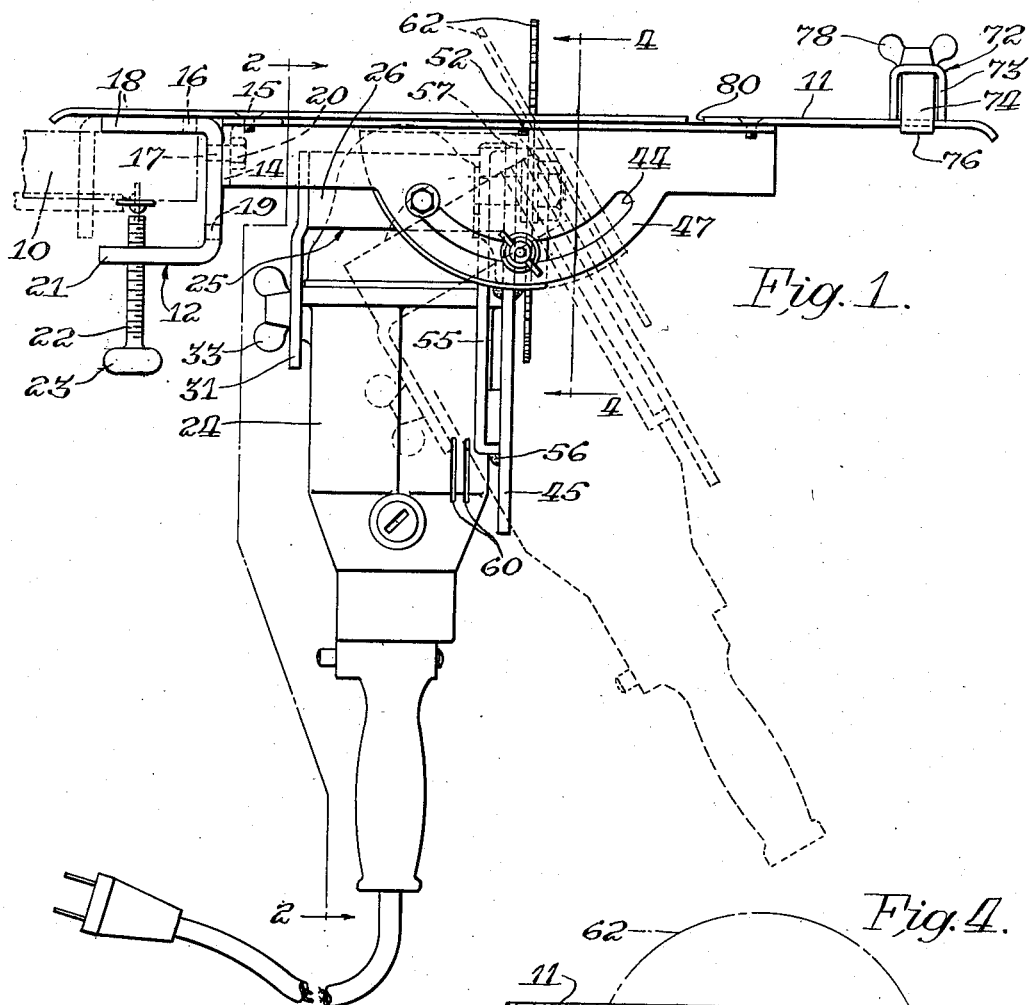
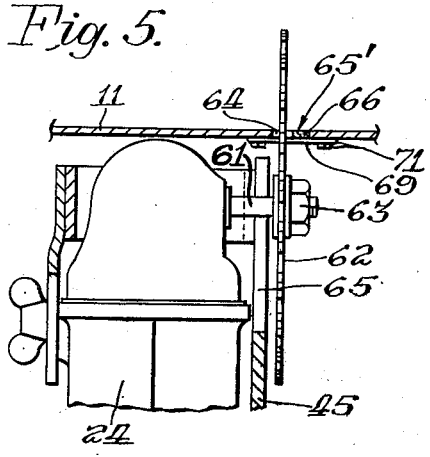
Inventor
Edward E. Grabinski
By Kenneth T. Snow
Atty.

Sept. 22, 1953     E. E. GRABINSKI     2,652,863
POWER-DRIVEN TABLE TOOL WITH PORTABLE
VERTICAL-SHAFT MOTOR
Filed May 11, 1948     3 Sheets-Sheet 2

Inventor
Edward E. Grabinski
By Kenneth T. Snow
Atty.

Sept. 22, 1953     E. E. GRABINSKI     2,652,863
POWER-DRIVEN TABLE TOOL WITH PORTABLE
VERTICAL-SHAFT MOTOR
Filed May 11, 1948     3 Sheets-Sheet 3
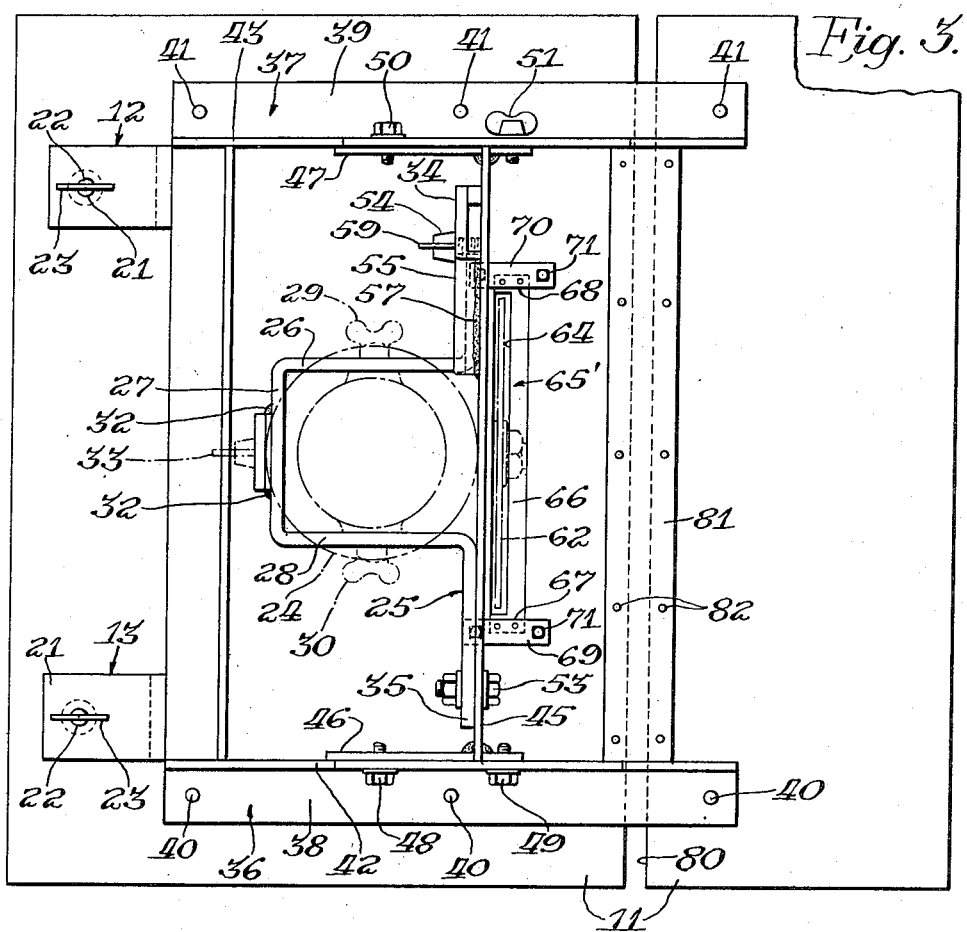
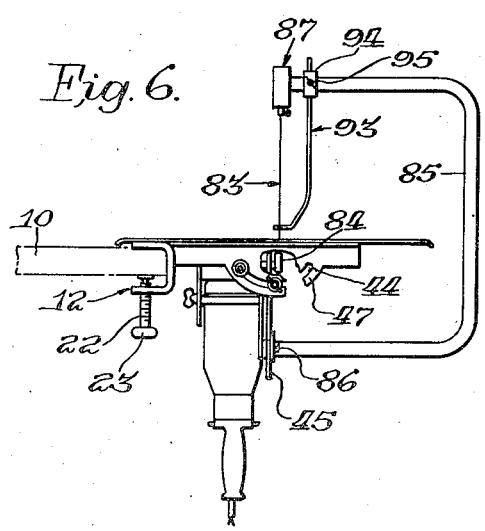
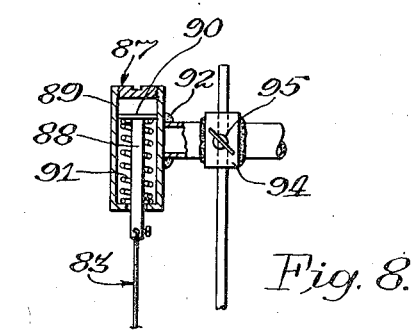
Inventor
Edward E. Grabinski
By Kenneth T. Snow
Atty.

Patented Sept. 22, 1953

2,652,863

UNITED STATES PATENT OFFICE 2,652,863

POWER-DRIVEN TABLE TOOL WITH PORTABLE VERTICAL-SHAFT MOTOR

Edward E. Grabinski, Chicago, Ill.

Application May 11, 1948, Serial No. 26,360

3 Claims. (Cl. 143—36)

This invention relates to a new and improved power driven tool and has for one of its principal objects the provision of means for angularly positioning a tool with respect to a table.

An important object of this invention is to provide a power driven saw tiltable for angular adjustment with respect to a table top and tiltable for vertical adjustment with respect to the table top.

Another important object of this invention is the provision of a power driven circular saw associated with a table and adjustable means for positioning the saw at various angles and height with respect to the table and including a member for shielding the source of power from the saw.

A further object of this invention is to provide a portable power driven tool arranged and constructed in such a manner as to be adaptable for use with various tools.

A still further object of this invention is the provision of a portable power driven tool including a table part and clamping means adapted to conveniently clamp the table part onto a stationary support for disposition in a horizontal plane.

Another and still further object of this invention is to supply a portable motor such as those used for floor sanders and adapt it for easy and efficient use with saws of the circular or jig type.

Still another object of this invention is to provide a portable motor driven saw including its own operating table and means mounting the motor beneath the table in a manner to permit swinging adjustment through planes at right angles to each other.

Still a further object is the provision of a table top for portable motor driven circular saws equipped with an easily adjustable guide for movement across the table toward and away from the saw.

Another object of the invention is to provide a table top for a power driven saw equipped with a slit-like aperture for passage of the saw tool and constructed in such a manner to vary the width of the slit by plugging a part thereof.

Other and further important objects of this invention will become apparent from the disclosures in the following specification and accompanying drawings.

In the drawings:

Fig. 1 is a side elevational view of the portable motor driven circular saw of this invention.

Fig. 3 is a bottom plan view of the device as shown in Figs. 1 and 2.

Fig. 4 (Sheet 1) is an elevational view partially in section of a portion of the device as viewed from the line 4—4 of Fig. 1.

Fig. 5 is a sectional view of the device taken on the line 5—5 of Fig. 2.

Fig. 6 (Sheet 3) is a front elevational view of the portable power driven tool arranged to operate a jig saw.

Fig. 8 (Sheet 3) is an enlarged sectional detail of the top of the jig saw of Figs. 6 and 7.

As shown in the drawings:

Figure 2:
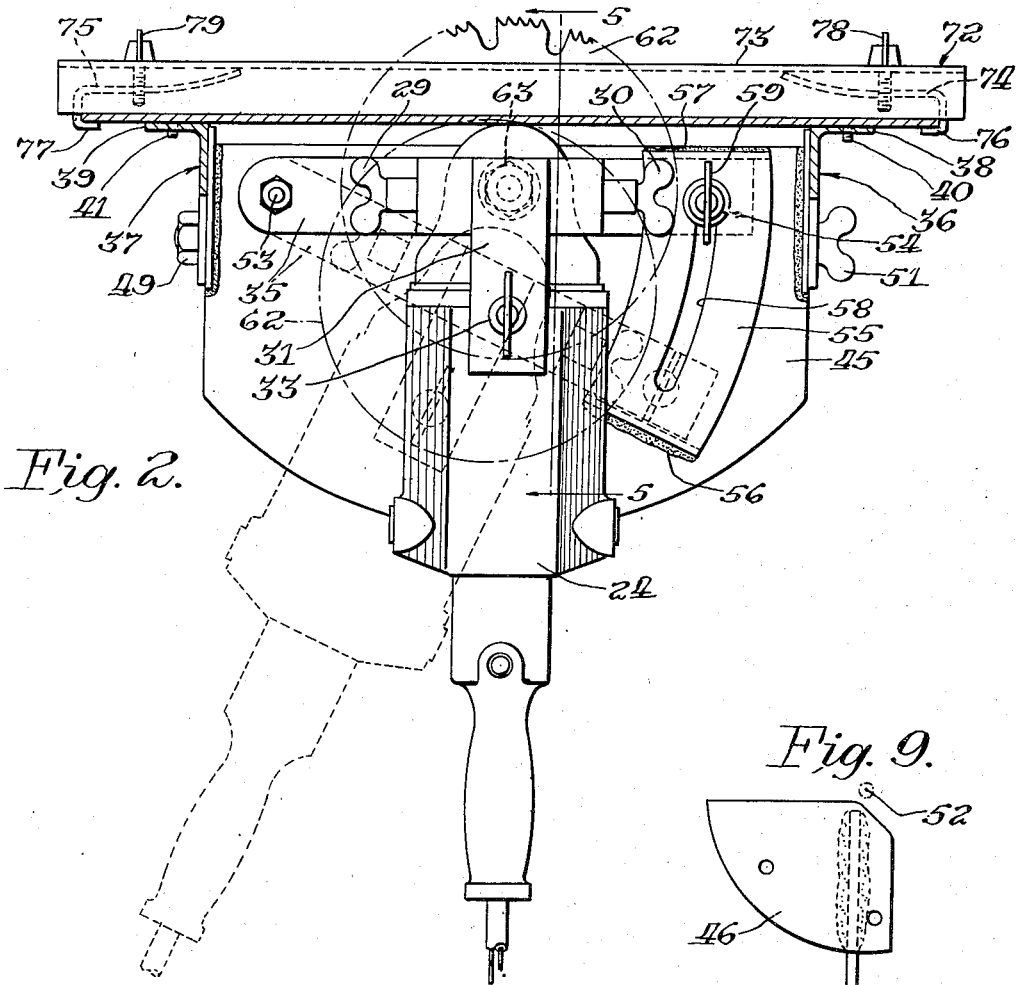
Fig. 2 is a sectional view taken on the line 2—2 of Fig. 1.

The reference numeral 10 indicates generally a support to which may be attached the portable power driven tool of this invention. The tool includes a table part or table top 11 which is adapted to be disposed generally horizontally. C clamps 12 and 13 are attached to the underside of the table top 11 in spaced apart aligned positions and are the means of effecting attachment to the support 10. As best shown in Fig. 1, an angle iron 14 is attached across and to the underside of the table top 11 by means of screws or the like 15. The C clamps 12 and 13 are provided with threaded apertures 16 and 17 in the top 18 and back 19 respectively of the clamp. Thus the clamp may be placed as shown in Fig. 1 wherein the bolt 20 passing through the angle member 14 engages the threaded aperture 17 holding the C clamp in position to engage a horizontally disposed support such as 10. The bottom 21 of the clamp carries a bolt member 22 with a winged head 23 for easy hand turning to grip the underside of the support 10. When the available fixed support is vertically disposed such as a carpenter's horse, the bolt 20 is removed from the aperture 17 and the clamp is rotated so that the open mouth of the clamp faces downwardly and the aperture 16 is in alignment with the bolt 20 so that the C clamp may be fixedly held to the underside of the table top in its new position through the medium of the angle member 14. In both instances, however, the table top is fixed in a flat horizontal plane.

An electric motor 24 such as ordinarily employed in portable floor sanders is employed as the source of power in this power driven tool. A bracket 25 has three sides 26, 27, and 28 (Fig. 3) encircling a major portion of the circumference of the motor 24. Thumb screws 29 and 30 pass through apertures in the sides 26 and 28 respectively and engage threaded apertures in the motor housing for clamping the bracket to the motor. A downwardly extending strap member 31 is welded or otherwise attached to the side 27 of the bracket 25 as shown at 32. A third thumb screw 33 passes through a suitable aperture in the lower end of the strap 31 and engages a threaded aperture in the motor housing. The bracket 25 and motor 24 are now fastened together as a rigid integral unit. The bracket 25 is further provided with outwardly bent end portions 34 and 35 as best shown in Fig. 3.

Figure 9:
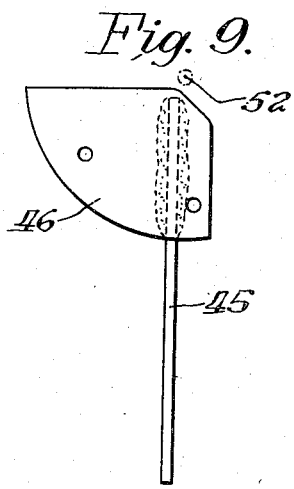
Fig. 9 (Sheet 2) is a detail of a shield and supporting plate construction.

The underside of the table top 11 is provided with spaced, aligned brackets 36 and 37 which as shown in Fig. 2 are in the form of angle members. The brackets 36 and 37 have flange members 38 and 39 respectively which are bolted or otherwise attached to the table top at 40 and 41. The vertically disposed portions 42 and 43 of the brackets 36 and 37 are equipped with horizontally aligned arcuate slots 44. A large plate 45 is normally positioned in a generally vertical plane to one side of the motor 24. This plate has welded to its opposite ends small brackets or plates 46 and 47. These small plates are parallel to and positioned closely adjacent the vertical portions of the brackets 36 and 37. As best shown in Fig. 3, bolts 48, 49, 50 and 51 pass through the arcuate slots 44 and thence through spaced apertures in the small end plates 46 and 47. The shape of the end plates 46 and 47 is best shown in Fig. 9 and is such that when the bolts 48, 49, 50 and 51 are loosened the large plate or shield 45 may be swung about an imaginary pivot at 52. The bolts 48, 49, 50 and 51 guide and limit movement of the plate 45 to the extent of the arcuate slots. Certain of the bolts are equipped with winged heads for facilitating manual adjustment of the angular position of the plate 45.

The motor bracket 25 is carried on the plate 45 by a hinging of the bracket arm 35 at 53 (Fig. 2) and an adjustable attachment of the arm 34 at 54. The plate 45 is provided with a bracket 55. This bracket member is arcuate in shape and is attached at its ends 56 and 57 by welding or the like to the side wall of the plate 45. The body of the bracket is spaced outwardly of the plate 45 and thus permits the arm 34 to slide between the bracket and the plate 45. The bracket 55 has an arcuate slot 58 which is formed about the hinge center 53. A winged top bolt 59 adjustably fastens the arm 34 to the bracket 55 in any desired position in the slot 58. The motor 24 may thus be swung about the hinge 53 through the limits of the arcuate slot 58 defining a first plane. Movement of the plate 45 about the hinges in the angle brackets 36 and 37 defines a second plane substantially at right angles to the first plane in which the motor may be swung.

The motor 24 has slots or louvers 60 in the housing for passage of air to provide cooling for the motor. A fan within motors is standard equipment to draw air in and through motor housings for cooling purposes. The plate 45 shields the openings 60 and prevents passage of sawdust or other shavings created by operation of the tool. Thus the plate 45, in addition to acting as an intermediate support for the motor about which the motor hinges in one plane, also acts as a very efficient dust shield and adds rigidity to the entire portable tool.

As best shown in Fig. 5, the motor 24 is provided with a driven shaft 61. The shaft 61 carries a circular saw 62 that is held in position on the shaft by a nut 63. The saw 62 is driven by the motor and as it forms a part of the motor it is shiftably adjustable with the motor through the planes at right angles to each other. The circular blade 62 projects upwardly through a slot 64 in the table top 11. Figures 4 and 5 show the arcuate slot 65 in the plate 45 through which the motor shaft 61 may freely swing when the motor is swung about the hinge 53. It is evident that as the motor is swung about hinge 53 the height of the saw 62 above the table 11 varies. Thus the depth of saw cut can be varied. The saw is shown fully extended in the full lines of Fig. 2 and is shown in its innermost position in the dashed lines of Fig. 2.

The movement of the motor and plate 45 through the other plane defined by the swinging around the hinge 52 causes the circular saw blade to be tilted to some angle with respect to the table top 11. The saw may be locked at any desired angle and will operate to cut material at that angle by moving the material into the saw over the flat table top 11. The table remains horizontally level throughout all swinging movements of the motor.

The slot 64 may be enlarged in its width by removing a plug 65'. The plug includes a strip 66 held at its ends 67 and 68 by attaching straps 69 and 70. See Fig. 3. Screws or the like 71 attach the straps 69 and 70 to the underside of the table top 11. When the plug 65' is removed the saw may be replaced by a wider saw or milling tool.

The table top 11 is also equipped with a laterally adjustable guide bar 72. The bar 72 comprises an inverted channel member 73 with arms riding on the table surface. The channel member 73 is somewhat longer than the width of the table. Clamp members 74 and 75 (Fig. 2) are positioned within the channel 73 at opposite ends thereof and have hook-like ends 76 and 77 adapted to engage the underside of the table top 11 as shown in Fig. 2. The hooks 76 and 77 are drawn up by thumb screws 78 and 79. When the screws are loosened the bar 72 may be moved toward or away from the saw to guide the material to be cut at any desired width.

Figure 3 shows that the table top 11 is split at 80 leaving a groove through which a mitering member may be guided in true parallel relationship with the saw 62. The angle members 36 and 37 act to hold the table parts together. A joining strip 81 covers the groove 80 on the underside and is fastened to the table by means of rivets or the like 82.

Figure 7:
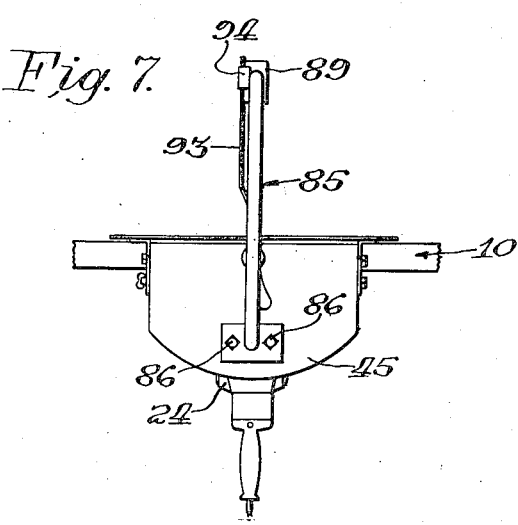
Fig. 7 (Sheet 2) is an end view of the jig saw device as shown in Fig. 6.

Figures 6, 7 and 8 show a modified use of the table and motor supporting hinged brackets. The circular saw has been removed and in lieu thereof a jig saw 83 is mounted thereon. An eccentric 84 is carried by the motor shaft 61 and causes vertical reciprocation of the jig saw through the saw slot 64 in the table top 11. The top of the jig saw 83 is supported by a C-shaped bracket 85. The bracket 85 is attached to the bottom of the plate 45 by bolts or the like 86 and thereupon extends laterally outwardly and thence upwardly outside the outer edge of the table top 11 and thence inwardly to its attachment at 87 to the jig saw. This last mentioned attachment is shown in detail in Fig. 8. The saw 83 is attached to a rod 88 which extends upwardly within an enclosed sleeve member 89. A piston or circular flange 90 is positioned at the top of the rod 88 and a spring 91 contained within the sleeve constantly urges the saw upwardly. Thus the saw must be pulled downwardly against the action of the spring 91. The sleeve 89 in turn is welded at 92 to the C bracket 85. A saw guide member 93 is equipped with an adjustable sleeve top 94 with a winged set screw 95 for vertical adjustment for various thicknesses of material. Swinging movement of the plate 45 about its hinge 52 will tilt the jig saw in the same manner as the circular saw. The lower end of the saw 83 moves with the motor driven shaft and the upper end moves by reason of its independent connection with the table encircling C bracket 85.

It is apparent that numerous power driven tools may be employed to advantage with this portable table and motor supporting hinged brackets. Thus many details of construction may be varied throughout a wide range without departing from the principles disclosed herein and I therefore do not propose limiting the patent granted hereon otherwise than as necessitated by the appended claims.

What is claimed is:

1. A power driven tool comprising a horizontally disposed table part, said table part having an aperture therethrough, an elongated motor generally vertically disposed beneath said table part, said motor having a driven shaft extending outwardly from the upper end thereof at a right angle thereto, a bracket fastened to said motor and having oppositely and laterally outwardly extending arms, spaced apart aligned vertically disposed angle brackets fixedly fastened to the underside of said table part on opposite sides of said table part aperture, said angle brackets having horizontally aligned arcuate slots, a relatively wide plate normally disposed vertically beneath said table part adjacent said table part aperture and having its ends terminating one adjacent each of said angle brackets, small brackets attached to the ends of said plate and having apertures therein in alignment with the arcuate slots in the angle brackets, bolt means adjustably fastening the small brackets to the angle brackets by passing through the apertures therein, one of said motor bracket arms hinged to one end of said plate, said plate on the other end thereof having a slot therein on an arc about the bracket arm hinge as a center, means for adjustably positioning the other of said motor bracket arms in the arcuate slot in said plate, said plate having an aperture therein for the passage of said motor driven shaft, and a work tool mounted on said motor driven shaft adjacent the side of the plate opposite the motor and its bracket, said work tool adapted to extend upwardly through the aperture in the table part whereby hinging of the plate will angularly adjust the work tool with respect to the table part and hinging of the bracket will determine the extension of the work tool above the table part.

2. A device as set forth in claim 1 in which the work tool is a circular saw.

3. A device as set forth in claim 1 in which the work tool is a jig saw and bracket means is attached to said plate and extends around the side of the table part and supports the top of said jig saw extending through the table part aperture.

EDWARD E. GRABINSKI.

References Cited in the file of this patent

UNITED STATES PATENTS

| Number | Name | Date |
|---|---|---|
| 119,139 | Hanson | Sept. 19, 1871 |
| 126,580 | Sanford | May 7, 1872 |
| 272,785 | Showalter | Feb. 20, 1883 |
| 1,081,578 | Casey | Dec. 16, 1913 |
| 1,314,291 | Wallace | Aug. 26, 1919 |
| 1,701,948 | Crowe | Feb. 12, 1929 |
| 1,799,215 | Colby | Apr. 7, 1931 |
| 1,898,956 | Harvie | Feb. 21, 1933 |
| 1,922,151 | Boice et al. | Aug. 15, 1933 |
| 1,993,219 | Merrigan | Mar. 5, 1935 |
| 2,106,288 | Tautz | Jan. 25, 1938 |
| 2,107,174 | Boice | Feb. 1, 1938 |
| 2,163,320 | Hammond | June 20, 1939 |
| 2,165,002 | Ocenasek | July 4, 1939 |
| 2,261,696 | Ocenasek | Nov. 4, 1941 |
| 2,265,335 | Aumann | Dec. 9, 1941 |
| 2,292,872 | Eastman | Aug. 11, 1942 |
| 2,371,451 | Larson | Mar. 13, 1945 |
| 2,374,286 | Hargadon | Apr. 24, 1945 |
| 2,430,161 | Csencsics | Nov. 4, 1947 |

FOREIGN PATENTS

| Number | Country | Date |
|---|---|---|
| 8,538 | Germany | Feb. 24, 1880 |
| 487,758 | Great Britain | June 24, 1938 |